United States Patent
Zheng et al.

(10) Patent No.: US 12,530,037 B1
(45) Date of Patent: Jan. 20, 2026

(54) METHOD FOR SCHEDULING TASK, AUTONOMOUS MOBILE MACHINE AND CONTROLLER

(71) Applicant: VisionNav Robotics USA Inc., Acworth, GA (US)

(72) Inventors: Fan Zheng, Acworth, GA (US); Yujie Lu, Acworth, GA (US); Lijun Yuan, Acworth, GA (US); Feng Zhang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/171,106

(22) Filed: Apr. 4, 2025

Related U.S. Application Data

(63) Continuation of application No. PCT/IB2025/052613, filed on Mar. 12, 2025.

(30) Foreign Application Priority Data

Jan. 27, 2025 (CN) .......................... 202510127630.3

(51) Int. Cl.
*G05D 1/246* (2024.01)
*G05D 1/646* (2024.01)
(Continued)

(52) U.S. Cl.
CPC ............ *G05D 1/246* (2024.01); *G05D 1/646* (2024.01); *G05D 1/667* (2024.01); *G05D 1/69* (2024.01);
(Continued)

(58) Field of Classification Search
None
See application file for complete search history.

(56) References Cited

U.S. PATENT DOCUMENTS

2022/0017341 A1* 1/2022 Henderson ............. G05D 1/024
2024/0184293 A1* 6/2024 Christman ........... G05D 1/0212

FOREIGN PATENT DOCUMENTS

| CN | 112767540 A | 5/2021 |
| CN | 114115263 A | 3/2022 |

(Continued)

OTHER PUBLICATIONS

Bouguerra et al., "An Autonomous Robotic System for Load Transportation", 2009 IEEE Conference on Emerging Technologies & Factory Automation, Sep. 1, 2009, pp. 1-4 (Year: 2009).*

*Primary Examiner* — Tamara L Weber
(74) *Attorney, Agent, or Firm* — Westbridge IP LLC

(57) ABSTRACT

Disclosed are a method for scheduling a task, an autonomous mobile machine and a controller. The method for scheduling the task includes: sending a mapping task instruction to a first autonomous mobile machine; receiving a planning map sent by the first autonomous mobile machine, where the planning map is obtained after the first autonomous mobile machine scans and maps a cargo container transportation vehicle by using a sensor mounted on the first autonomous mobile machine; and generating a handling task based on the planning map, and sending a handling task instruction to a second autonomous mobile machine, where the handling task instruction includes a handling task path. For a scenario where a docking position and a docking posture of the cargo container transportation vehicle are different each time, the present disclosure may ensure that the autonomous mobile machine executes the handling task accurately.

21 Claims, 5 Drawing Sheets

(51) Int. Cl.
    *G05D 1/667*     (2024.01)
    *G05D 1/69*     (2024.01)
    *G05D 105/20*     (2024.01)
    *G05D 105/80*     (2024.01)
    *G05D 107/50*     (2024.01)
    *G05D 109/10*     (2024.01)
    *G05D 111/10*     (2024.01)

(52) U.S. Cl.
    CPC ..... *G05D 2105/20* (2024.01); *G05D 2105/87* (2024.01); *G05D 2107/50* (2024.01); *G05D 2109/10* (2024.01); *G05D 2111/17* (2024.01)

(56) References Cited

FOREIGN PATENT DOCUMENTS

| | | | | | |
|---|---|---|---|---|---|
| CN | 114265374 | A | | 4/2022 | |
| CN | 114265375 | A | | 4/2022 | |
| CN | 114972668 | A | * | 8/2022 | ............. G06T 19/20 |
| CN | 115903826 | A | | 4/2023 | |
| CN | 116310405 | A | | 6/2023 | |
| JP | 2022156698 | A | | 10/2022 | |

* cited by examiner

METHOD FOR SCHEDULING TASK, AUTONOMOUS MOBILE MACHINE AND CONTROLLER

CROSS-REFERENCE TO RELATED APPLICATIONS

The present application is a continuation application of International Application No. PCT/IB2025/052613, filed on Mar. 12, 2025, which claims priority to Chinese Patent Application No. 202510127630.3, filed on Jan. 27, 2025. Both applications are incorporated herein by reference in their entireties.

TECHNICAL FIELD

The present disclosure relates to the field of intelligent control technologies, and in particular, to a method for scheduling a task, an autonomous mobile machine and a controller.

BACKGROUND

A system that employs an autonomous mobile machine such as an automated guided vehicle (AGV) has advantages of high levels of unmanned operation, automation, intelligence, and the like, which improves production efficiency and operational level for industries such as warehousing, manufacturing, and logistics. As a typical scenario of this system, an autonomous mobile machine is often responsible for a handling task of a cargo container transportation vehicle, such as a container truck, a container ship, and the handling task mainly includes loading/unloading operation. For example, the autonomous mobile machine transports cargo in a staging region into a trailer of the container truck, or transports cargo in the trailer of the container truck to the staging region.

Since a docking position and a docking posture of the cargo container transportation vehicle are different each time, how to ensure that the autonomous mobile machine can accurately execute the handling task becomes an urgent problem to be solved.

SUMMARY

In view of this, the present disclosure provides a method for scheduling a task, a method for executing a task, a system, and an autonomous mobile machine, to facilitate an autonomous mobile machine accurately executing a handling task.

According to a first aspect of the present disclosure, a method for scheduling a task is provided, which is performed by a control system, and the method includes:
  sending a mapping task instruction to a first autonomous mobile machine;
  receiving a planning map sent by the first autonomous mobile machine, where the planning map is obtained after the first autonomous mobile machine scans and maps a cargo container transportation vehicle by using a sensor mounted on the first autonomous mobile machine; and
  generating a handling task based on the planning map, and sending a handling task instruction to a second autonomous mobile machine, where the handling task instruction includes a handling task path, and the handling task path is path information from a second departure position to a target storage position on the cargo container transportation vehicle.

The first autonomous mobile machine and the second autonomous mobile machine are a same autonomous mobile machine or different autonomous mobile machines.

Optionally, the mapping task instruction includes a static mapping path, the static mapping path is path information from a first departure position to a target position, and the target position is within a preset range from the cargo container transportation vehicle; and
  the first departure position and the second departure position are a same position or different positions.

Optionally, before the sending the mapping task instruction to the first autonomous mobile machine, the method further includes:
  planning the static mapping path according to a working map and position information of the cargo container transportation vehicle.

Optionally, the mapping task instruction further includes: information indicating unloaded mapping or information indicating loaded mapping.

Optionally, in a case that the mapping task instruction includes the information indicating loaded mapping, the static mapping path includes a path from the first departure position to a storage position in a staging region and a path from the storage position in the staging region to the target position.

Optionally, the mapping task instruction further includes a dynamic mapping path and/or return path information, and the dynamic mapping path is path information for entering a loading space of the cargo container transportation vehicle from the target position.

Optionally, the generating the handling task based on the planning map includes:
  determining a position of the target storage position on the cargo container transportation vehicle and a dynamic handling path according to the planning map and a cargo size, where the dynamic handling path is a path from a target position to the target storage position, and the target position is within a preset range from the cargo container transportation vehicle; and
  generating the handling task according to a storage position in a staging region, material handling scenario information and the dynamic handling path.

Optionally, before the sending the handling task instruction to the second autonomous mobile machine, the method further includes:
  generating the handling task path according to the second departure position, a working map and the dynamic handling path.

Optionally, a type of the handling task is a loading task, and the handling task path includes: a path from the second departure position to the storage position in the staging region, a path from the storage position in the staging region to the target position, and a path from the target position to the target storage position; or,
  a type of the handling task is an unloading task, and the handling task path further includes a path from the target storage position to the storage position in the staging region.

According to a second aspect of the present disclosure, a method for executing a task is provided, which is performed by a first autonomous mobile machine, the method includes:
  controlling, in response to a mapping task instruction sent by a control system, the first autonomous mobile machine to move from a first departure position to a target position, where the target position is within a preset range from a cargo container transportation vehicle;

scanning and mapping the cargo container transportation vehicle by using a sensor mounted on the first autonomous mobile machine to obtain a planning map; and sending the planning map to the control system, where the planning map is configured to generate a handling task for the cargo container transportation vehicle, and the handling task is performed by a second autonomous mobile machine.

The first autonomous mobile machine and the second autonomous mobile machine are a same autonomous mobile machine or different autonomous mobile machines.

Optionally, the mapping task instruction includes a static mapping path, and the static mapping path is path information from the first departure position to the target position.

Optionally, in a case that the mapping task instruction includes information indicating loaded mapping, controlling the first autonomous mobile machine to move from the first departure position to the target position includes:

controlling the first autonomous mobile machine to move from the first departure position to a storage position in a staging region, and controlling the first autonomous mobile machine to move from the storage position in the staging region to the target position after handling cargo from the storage position in the staging region.

Optionally, the scanning and mapping the cargo container transportation vehicle by using the sensor mounted on the first autonomous mobile machine to obtain the planning map includes:

controlling the first autonomous mobile machine to move from the target position and enter a loading space of the cargo container transportation vehicle;

scanning environment data by using the sensor in a moving process, and obtaining a second point cloud map for entering the loading space from the target position by using a Simultaneous Localization and Mapping (SLAM) module; and projecting the second point cloud map to a ground plane to obtain the planning map.

Optionally, the mapping task instruction further includes a dynamic mapping path, and the dynamic mapping path is path information for entering the loading space of the cargo container transportation vehicle from the target position.

Optionally, the controlling the first autonomous mobile machine to move from the target position and enter the loading space of the cargo container transportation vehicle includes:

controlling the first autonomous mobile machine to start from the target position, move around the cargo container transportation vehicle and determine a position of entering the loading space, and enter the loading space from a determined position.

Optionally, the projecting the second point cloud map to the ground plane to obtain the planning map includes:

extracting, from the second point cloud map, point cloud data within an operating height range of the cargo container transportation vehicle; and projecting extracted point cloud data to the ground plane and performing binarization processing to obtain the planning map.

Optionally, in a process of controlling the first autonomous mobile machine to move from the first departure position to the target position, the method further includes: scanning environment data by using the sensor, obtaining a key frame from the first departure position to the target position by using the SLAM module, and splicing the key frame with a static point cloud map loaded during initialization of the first autonomous mobile machine to obtain a first point cloud map.

Optionally, the method further includes:

splicing the first point cloud map and the second point cloud map to obtain and store a third point cloud map.

Optionally, in a case that the second autonomous mobile machine and the first autonomous mobile machine are a same autonomous mobile machine, the second autonomous mobile machine is configured to determine a pose according to the third point cloud map in a process of executing the handling task; or, in a case that the second autonomous mobile machine and the first autonomous mobile machine are different autonomous mobile machines, the method further includes: transmitting, by the first autonomous mobile machine, the third point cloud map to the second autonomous mobile machine, to enable the second autonomous mobile machine to determine a pose according to the third point cloud map in a process of executing the handling task.

Optionally, in a case that the second autonomous mobile machine and the first autonomous mobile machine are a same autonomous mobile machine, after scanning and mapping the cargo container transportation vehicle, the method further includes: controlling the first autonomous mobile machine to move to a second departure position and wait for a handling task instruction sent by the control system.

The first departure position and the second departure position are a same position or different positions.

According to a third aspect of the present disclosure, a system is provided, which includes a control system, a first autonomous mobile machine and a second autonomous mobile machine.

The control system is configured to send a mapping task instruction to the first autonomous mobile machine;

the first autonomous mobile machine is configured to: control, in response to the mapping task instruction, the first autonomous mobile machine to move from a first departure position to a target position, where the target position is within a preset range from a cargo container transportation vehicle; scan and map the cargo container transportation vehicle by using a sensor mounted on the first autonomous mobile machine to obtain a planning map; and send the planning map to the control system;

the control system is further configured to generate a handling task based on the planning map, and send a handling task instruction to the second autonomous mobile machine, where the handling task instruction includes a handling task path, and the handling task path is path information from a second departure position to a target storage position on the cargo container transportation vehicle; and the second autonomous mobile machine is configured to execute the handling task according to the handling task instruction.

The first autonomous mobile machine and the second autonomous mobile machine are a same autonomous mobile machine or different autonomous mobile machines, and the first departure position and the second departure position are a same position or different positions.

According to a fourth aspect of the present disclosure, an autonomous mobile machine is provided, and the autonomous mobile machine may be the first autonomous mobile machine. The autonomous mobile machine includes:

an autonomous mobile machine body;

a sensor, mounted on the autonomous mobile machine body, and configured to scan a cargo container transportation vehicle;

a memory, configured to store program instructions; and a processor, coupled to the memory, and configured to read the program instructions to perform steps of the method according to the second aspect.

According to a fifth aspect of the present disclosure, an electronic device is provided, which includes:

a processor; and a memory configured to store an instruction executable by the processor, where the processor is configured to implement the method for scheduling the task according to the first aspect, or the method for executing the task according to the second aspect. For example, the electronic device includes a controller, and the controller includes: a processor; and a memory configured to store an instruction executable by the processor, where the processor is configured to implement the method for executing the task according to the second aspect. Specifically, the controller may be a controller of an autonomous mobile machine.

According to a sixth aspect of the present disclosure, a computer-readable storage medium is provided, the storage medium stores a computer program, and the computer program is used to implement the method for scheduling the task according to the first aspect, or the method for executing the task according to the second aspect.

BRIEF DESCRIPTION OF THE DRAWINGS

In order to more clearly illustrate embodiments of the present disclosure or technical solutions in a related art, the accompanying drawings required in the embodiments are briefly described below. Obviously, the accompanying drawings in the following description are merely some embodiments of the present disclosure, and for those of ordinary skill in the art, other drawings may be obtained according to these accompanying drawings without creative efforts.

DETAILED DESCRIPTION OF THE EMBODIMENTS

Figure 1:
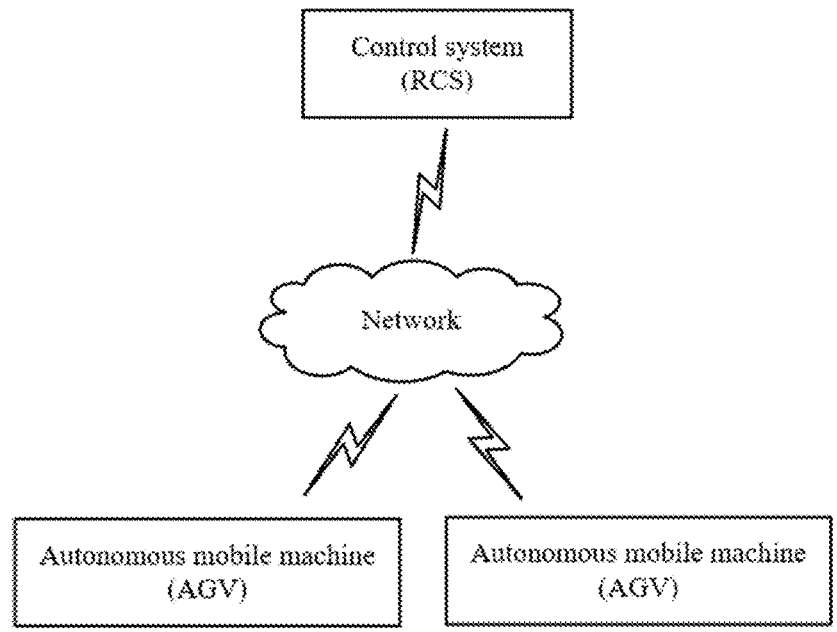
FIG. 1 is a diagram of a system architecture applicable to embodiments of the present disclosure.

The following clearly and completely describes the technical solutions in the embodiments of the present disclosure with reference to the accompanying drawings in the embodiments of the present disclosure. Obviously, the described embodiments are a portion of the embodiments of the present disclosure and not all of the embodiments. All other embodiments obtained by a person of ordinary skill in the art based on the embodiments of the present disclosure fall within the protection scope of the present disclosure.

The terms used in the embodiments of the present disclosure are merely for a purpose of describing particular embodiments, and are not intended to limit the present disclosure. The singular forms "a" and "the" used in the embodiments of the present disclosure and the appended claims are also intended to include plural forms, unless the context clearly indicates other meanings.

It should be understood that the term "and/or" used in this specification is merely an association relationship for describing associated objects, which indicates that there may be three relationships, for example, A and/or B may indicate that A exists alone, A and B exist at the same time, and B exists alone. In addition, the character "/" in this specification generally indicates an "or" relationship between the associated objects.

Depends on the context, the word "if" used herein may be interpreted as "during" or "when" or "in response to determining" or "in response to detecting". Similarly, depends on the context, the phrase "if determined" or "if detected (a stated condition or event)" may be interpreted as "when determining" or "in response to determining" or "when detecting (the stated condition or event)" or "in response to detecting (the stated condition or event)". In addition, the term "according to" used herein is not limited to a certain object only, for example, determining B according to A, which may be expressed as: B is determined only according to A, or B is determined partly according to A.

To facilitate understanding of the technical solutions of the present disclosure, explanations of relevant terms in the specification are provided first in the following.

Processor: it is responsible for executing core functions such as calculation, control and decision-making. It may receive data from a sensor, run control algorithms, and command an actuator to complete a task. Common processor types may include: a central processing unit (CPU), a digital signal processor (DSP), a microcontroller unit (MCU), and so on. The processor in the specification may refer to a collection of processors for performing the same or different tasks.

Memory: it is configured to store data or a program. A memory in the specification may be referred to as a collection of memories for performing the same or different tasks.

Controller: at the hardware level, the controller generally includes a processor and a memory. Optionally, the controller may also include input and output interfaces, a mainboard, peripheral circuits and elements. At the software level, the controller generally includes a control algorithm, an operating system, a communication protocol, and so on. A controller in the specification may be referred to as a collection of controllers for performing the same or different tasks.

Autonomous mobile machine: it refers to a mobile machine that can perform a task autonomously or semi-autonomously. Common types include an automated guided vehicle (AGV), an autonomous mobile robot (AMR), a humanoid robot, and the like, and also include other types such as a smart car and a robotic vacuum cleaner.

Due to a limited space of the cargo container transportation vehicle, in order to avoid collision, there is a very high requirement on a positioning accuracy of an autonomous mobile machine. However, since a docking position and a docking posture of the cargo container transportation vehicle vary each time, a map cannot be pre-established for the cargo container transportation vehicle. In existing implementations, some of them need to install an external sensor near a cargo container transportation vehicle to scan the cargo container transportation vehicle when the cargo container transportation vehicle arrives each time, so as to establish a map. However, this method has at least following drawbacks.

Firstly, in order to ensure accuracy of mapping, the external sensor needs to completely scan the cargo container transportation vehicle, especially an internal environment of the cargo container transportation vehicle, such as an interior of a trailer. Therefore, there is usually a need to place the external sensor at a bridging position between an edge of an outer dock and the cargo container transportation vehicle. The bridging position is a position where the autonomous mobile machine enters and exits the cargo container transportation vehicle, and a passage space needs to be reserved, which brings difficulty to an installation position of the external sensor, and a construction requirement is extremely high.

Secondly, since a map obtained by the external sensor through scanning needs to be spliced with a static map of the autonomous mobile machine, it is necessary to calibrate a coordinate transformation relationship between the two maps, and a requirement for calibration precision is very high, otherwise, it may lead to collisions of the autonomous mobile machine inside the cargo container transportation vehicle, for example, collisions with a wall of a trailer of a container truck.

Lastly, the external sensor needs to be connected with an additional power line and a network cable, and faces a semi-open outdoor environment. In order to avoid an influence of wind, rain, and sun exposure, the external sensor needs to be protected and maintained in a long time, thereby bringing additional maintenance costs.

In view of this, the present disclosure provides a new idea. To facilitate understanding of the present disclosure, a system architecture on which the present disclosure is based is first described. FIG. 1 shows an exemplary system architecture to which embodiments of the present disclosure may be applied. As shown in FIG. 1, the system architecture may include an autonomous mobile machine and a control system.

The autonomous mobile machine refers to a tool equipped with electromagnetic or optical automatic guided equipment or other automatic guided equipment, which is controlled by a computer, equipped with its own power source or power conversion equipment, and can automatically move along a specified path. In the embodiments of the present disclosure, the autonomous mobile machine is capable of performing a specific task while moving, for example, transportation, handling (including cargo loading and unloading), or the like. For example, the autonomous mobile machine may be an automated guided vehicle (AGV), a logistics robot, an intelligent forklift, or the like.

In the embodiments of the present disclosure, the autonomous mobile machine is equipped with a vehicle-mounted software system, and the vehicle-mounted software system has a function of Simultaneous Localization and Mapping (SLAM), a map generation function of generating a planning map based on a mapping result, a motion control function of controlling the autonomous mobile machine to move and work, and other functions.

A control system, such as a Remote Control System (RCS), may be disposed on a server side, and is responsible for scheduling autonomous mobile machines, which includes task assignment, path planning, instruction issuing, or the like. More detailed information may be referred to related descriptions in subsequent embodiments.

The control system described above may be disposed on an independent server, or may be disposed on a server group, or may be disposed on a cloud server. The cloud server is also referred to as a cloud computing server or a cloud host, and is a host product in a cloud computing service system, to overcome defects of large management difficulty and weak service scalability existing in a traditional physical host and a virtual private server (VPS) service. In addition, the control system may also be disposed on a computer terminal having a relatively strong computing capability.

It should be understood that the number of the autonomous mobile machine and the control system in FIG. 1 is merely illustrative. There may be any number of the autonomous mobile machine and the control system depending on implementation needs.

Figure 2:
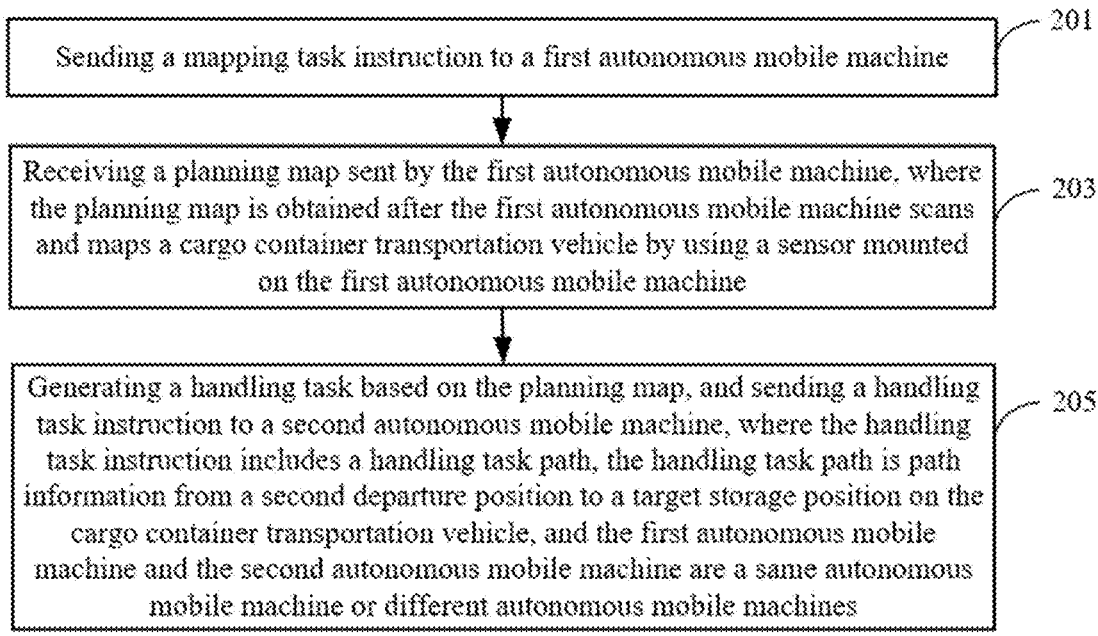
FIG. 2 is a flowchart of a method for scheduling a task according to an embodiment of the present disclosure.

FIG. 2 is a flowchart of a method for scheduling a task according to an embodiment of the present disclosure, and the method may be performed by the RCS in the system shown in FIG. 1. As shown in FIG. 2, the method may include the following steps.

Step 201: sending a mapping task instruction to a first autonomous mobile machine.

Step 203: receiving a planning map sent by the first autonomous mobile machine, where the planning map is obtained after the first autonomous mobile machine scans and maps a cargo container transportation vehicle by using a sensor mounted on the first autonomous mobile machine.

Step 205: generating a handling task based on the planning map, and sending a handling task instruction to a second autonomous mobile machine, where the handling task instruction includes a handling task path, the handling task path is path information from a second departure position to a target storage position on the cargo container transportation vehicle, and the first autonomous mobile machine and the second autonomous mobile machine are a same autonomous mobile machine or different autonomous mobile machines.

It can be seen from the above process that the control system in the present disclosure adopts a two-stage task. Firstly, the first autonomous mobile machine is scheduled to execute a, and in a process of executing the mapping task by the first autonomous mobile machine, the cargo container transportation vehicle is scanned and mapped by using the sensor mounted on the first autonomous mobile machine to obtain the planning map; and then the second autonomous mobile machine is scheduled based on the planning map to execute the handling task. According to this two-stage task scheduling mode, even if a docking position and a docking posture of the cargo container transportation vehicle are different each time, a pose of the cargo container transportation vehicle may be obtained in real time and the planning map is obtained through a mapping task stage, thereby ensuring that the second autonomous mobile machine, which executes the handling task in the second stage, may accurately perform loading and unloading operations.

In addition, since the sensor mounted on the first autonomous mobile machine is used to scan and map the cargo container transportation vehicle, compared with a traditional method of using an external sensor mounted on a bridging position, a construction difficulty and maintenance cost are reduced and a relationship between a coordinate system of the external sensor and a coordinate system of the autonomous mobile machine is also prevented from being calibrated, so that an implementation is more convenient, and a cost is lower.

The steps in the above process and effects that can be further generated are described in detail below with reference to a specific embodiment. It should be noted that terms such as "first" and "second" involved in the present disclosure do not have limitations in terms of size, order and quantity, and are only used to distinguish between names.

Figure 3:
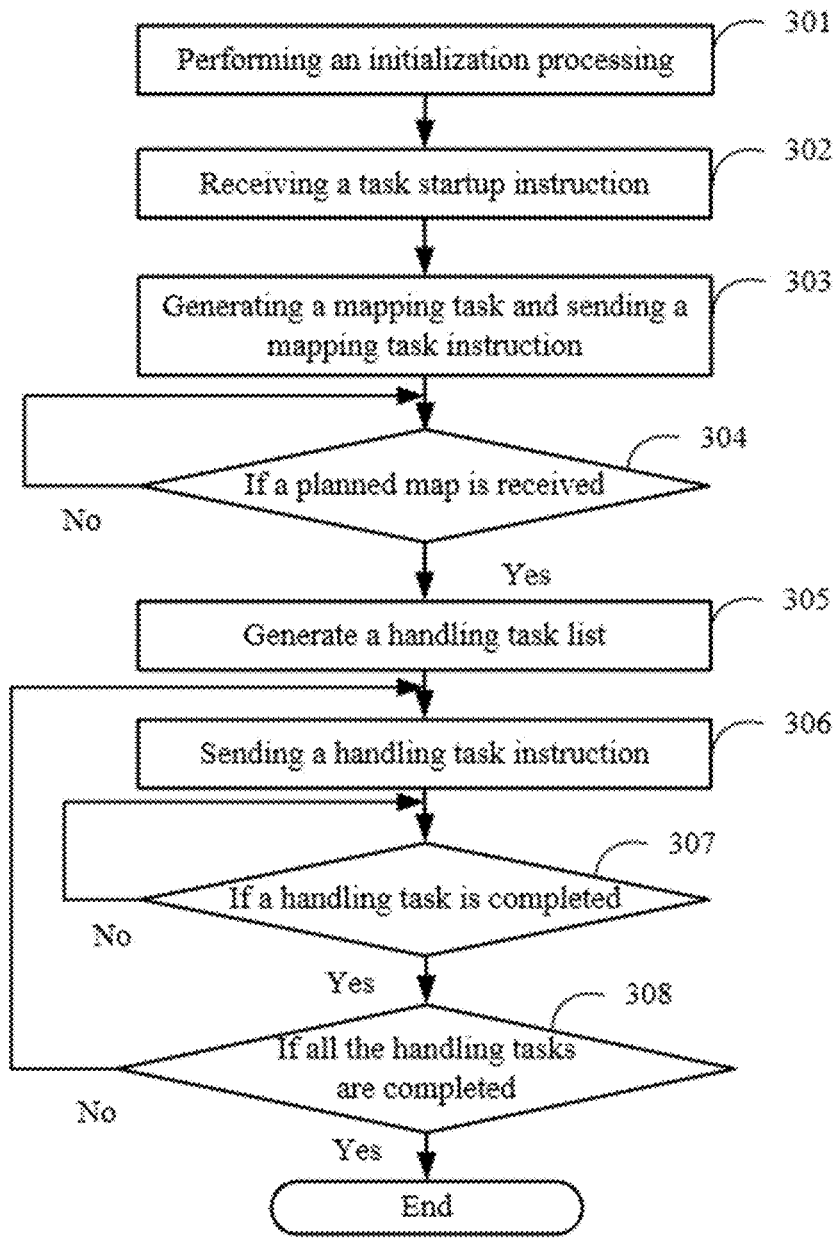
FIG. 3 is a flowchart of a detailed method performed by a control system according to an embodiment of the present disclosure.

In the embodiments of the present disclosure, after the control system is started, as shown in FIG. 3, initialization processing in step 301 may be performed first. The initialization processing includes loading a working map, establishing a communication connection with each autonomous mobile machine, and the like. The working map may be a static environment map, which includes road network information of a working environment where the autonomous mobile machine is located, that is, the working map is formed by connecting a plurality of path segments and covers a working region of the autonomous mobile machine. In the embodiments of the present disclosure, the foregoing working region mainly refers to a region such as a warehouse, a dock, and a staging region, and may include a position of boarding the cargo container transportation vehicle, but usually does not include a region beyond a position of boarding the cargo container transportation vehicle (for example, a region of a loading space of the cargo container transportation vehicle, or the like).

Figure 4:
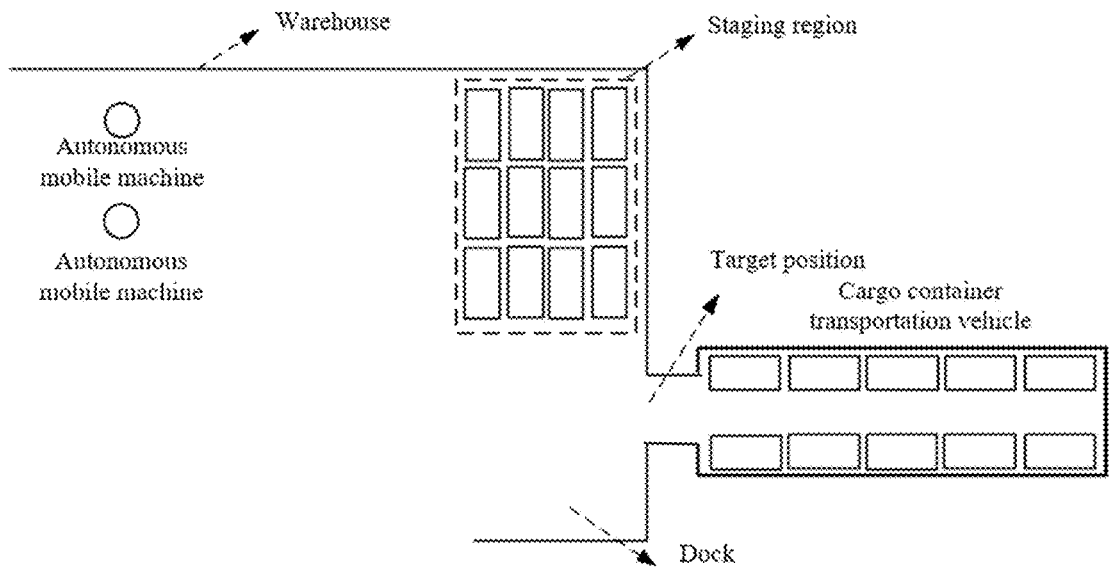
FIG. 4 is a schematic diagram of a working region of a handling task according to an embodiment of the present disclosure.

For ease of understanding, the foregoing regions are briefly described with reference to FIG. 4. As shown in FIG. 4, when the autonomous mobile machine does not perform work, it is usually located at its own parking position, and the parking position may be a position located in a warehouse, a carport, or the like. The cargo container transportation vehicle may be, for example, a truck, a cargo ship, a flying wing vehicle, or the like. The cargo container transportation vehicle has a loading space, and the loading space may be, for example, a trailer, a platform, a rack, or the like, and a position where cargo is placed in the loading space is referred to as a storage position. The cargo container transportation vehicle is usually docked at a specified position of a dock, and a bridging position between the dock and the cargo container transportation vehicle is usually used for the autonomous mobile machine to board the cargo container transportation vehicle, such as, a bridging position to board a truck, or a bridging position to board a ship. When executing the handling task, the autonomous mobile machine needs to handle cargo at each storage position in the staging region to a storage position in the cargo container transportation vehicle (that is, loading) or handle cargo at the storage position in the cargo container transportation vehicle to the storage position in the staging region (that is, unloading).

In the embodiments of the present disclosure, the working map loaded during initialization process of the control system may include road network information, which may include a warehouse, a staging region, and a dock region shown in FIG. 4. The working map may be composed of various path segments connected end to end.

A target position may be a preset position in the working map. In the embodiments of the present disclosure, the target position is usually a position within a preset range from the cargo container transportation vehicle, and a function of this design of the target position is to enable the autonomous mobile machine (that is, the first autonomous mobile machine) executing a mapping task to start to scan the cargo container transportation vehicle from the target position after the autonomous mobile machine reaches the target position. For example, the target position may be set to a position to board the cargo container transportation vehicle. For example, if the cargo container transportation vehicle is a container truck, the target position may be a bridging position to board a truck. For another example, if the cargo container transportation vehicle is a container ship, the target position may be a bridging position to board a ship. For another example, if the cargo container transportation vehicle is a flying wing vehicle, the target position may be any position near the flying wing vehicle.

In the embodiments of the present disclosure, the target position may be one or more. For example, in the working region, there may be docking positions of a plurality of container trucks, and each container truck has a bridging position to board a truck, so that each container truck corresponds to its own target position.

As shown in FIG. 3, in step 302, the RCS receives a task startup instruction, and then the RCS performs step 303 to generate a mapping task, and send a mapping task instruction to the first autonomous mobile machine.

The task startup instruction may be sent by a staff through triggering a terminal device, for example, when the staff determines that the cargo container transportation vehicle is docked to a dock position, the staff triggers the terminal device to send a task startup instruction to the RCS through a physical or virtual key on the terminal device, or through inputting an instruction. In addition to being triggered by a staff, other methods may also be used.

The RCS generates the mapping task after receiving the task startup instruction, and a process of generating the mapping task is mainly a path planning process, that is, a path from the first departure position to the target position is planned according to the working map and position information of the cargo container transportation vehicle.

The position information of the cargo container transportation vehicle may be obtained from the task startup instruction, for example, the docking position of each cargo container transportation vehicle may be numbered, the number is carried in the task startup instruction and sent to the RCS, and the RCS can determine, according to the number, an approximate docking position of the cargo container transportation vehicle and a corresponding target position (for example, a position to board the cargo container transportation vehicle from a dock).

In the embodiments of the present disclosure, a path segment refers to a smaller part or a unit constituting a path. A planned path is a path segment sequence formed by sequentially connecting a plurality of path segments end to end, a starting point of a first path segment is a starting point of current path planning, that is, a departure position (referred to as a first departure position in the embodiments of the present disclosure) of the first autonomous mobile machine, and an end point of a last path segment is an end point of the current path planning, that is, the target position.

Further, each path segment in a planned path segment sequence corresponds to information of a time window, and the time window is time information indicating that a target autonomous mobile machine moves along a corresponding path segment, and is usually represented by a time interval, that is, the time window. It may be understood that the target autonomous mobile machine passes through the path segment during the time interval corresponding to the time window.

In this step, as an implementable manner, a path search algorithm such as A-Star may be used to perform path planning for the target autonomous mobile machine to generate the path segment sequence from the starting point to the end point, and the path segment sequence is used as a path corresponding to the mapping task.

As another better implementation, a path search algorithm such as A-Star may be used to perform path planning for the target autonomous mobile machine, and after the path segment sequence from the starting point to the end point is generated, optimization based on conflict detection is further performed on the path segment sequence. The path segment sequence obtained after optimization is used as the path corresponding to the mapping task.

The optimization based on conflict detection refers to comparing each path segment in the path segment sequence planned for the first autonomous mobile machine with planned paths of other autonomous mobile machines one by one, to determine whether there is a conflict, and updating the information of the time window in the path segment sequence based on a conflict detection result.

If a same time in a path segment sequence currently planned for the first autonomous mobile machine and planned paths of other autonomous mobile machines corresponds to a same path segment, it indicates that there is a risk of collision between the first autonomous mobile machine and other autonomous mobile machines, and therefore there is a conflict in the path segment.

Or, if a distance between two path segments corresponding to a same time in a path segment sequence currently planned for the first autonomous mobile machine and planned paths of other autonomous mobile machines is insufficient to accommodate two corresponding autonomous mobile machines, it indicates that there is a risk of collision between the first autonomous mobile machine and other autonomous mobile machines, and therefore there is a conflict between the two path segments. During detection, a safety distance corresponding to the two autonomous mobile machines may be determined according to geometric sizes of the two autonomous mobile machines (the first autonomous mobile machine and the other autonomous mobile machine). A distance between path segments corresponding to a same time in the current path segment sequence of the first autonomous mobile machine and a planned path of another autonomous mobile machine is determined according to the safety distance, and if the distance is less than the safety distance, there is a conflict between the two path segments.

If a conflict is detected in a path segment in a current path segment sequence, in order to avoid collision, the first autonomous mobile machine may be instructed to wait for a period of time before entering the path segment, so that a waiting time may be set before the path segment with a conflict in the current path segment sequence and the time window corresponding to each path segment can be updated. The waiting time may be set as a fixed duration, or it may be determined according to the information of the time window corresponding to a conflicting path segment.

After the update is completed, a conflict detection may continue to be performed on a current path segment sequence obtained after the update until no conflict is detected. Through this planning method, it may be ensured that there is no conflict in planned paths of all the autonomous mobile machines at a same time.

After obtaining the path information from the first departure position to the target position, the path information is referred to as a static mapping path in the embodiments of the present disclosure, and the static mapping path may be included in the mapping task instruction and sent to the first autonomous mobile machine.

Further, the mapping task instruction may further include path information for entering a loading space of the cargo container transportation vehicle from the target position, and the path information is referred to as a dynamic mapping path in the embodiments of the present disclosure.

Due to a fact that there is no accurate map of the cargo container transportation vehicle at present, the path information (that is, the dynamic mapping path) for entering the loading space of the cargo container transportation vehicle from the target position may be preset with a low accuracy requirement, and it can be preset according to an approximate docking position and size of the cargo container transportation vehicle, as long as it is ensured that the autonomous mobile machine does not collide with the cargo container transportation vehicle.

Further, the mapping task instruction may further include return path information, the return path information may be a path returned from the target position to the first departure position, with a purpose of enabling the first autonomous mobile machine to return to the first departure position after completing scanning of the cargo container transportation vehicle.

In addition, the mapping task instruction described above may be divided into following two cases.

In one case, the mapping task instruction is an unloaded mapping instruction, and at this time, the mapping task instruction may include information indicating unloaded mapping. The unloaded mapping refers to that an unloaded form is used by the first autonomous mobile machine in an entire mapping process. In this case, the above static mapping path may be a path from the first departure position directly to the target position.

In another case, the mapping task instruction is a loaded mapping instruction, and at this time, the mapping task instruction may include information indicating loaded mapping. The loaded mapping refers to that after picking up cargo from a storage position in a staging region, the first autonomous mobile machine carries the cargo during a mapping process, therefore, when a first handling task is performed after a mapping is completed, there is no need to pick up cargo from the storage position in the staging region again, so that efficiency is improved. In this case, the above static mapping path includes a path from the first departure position to the storage position in the staging region and a path from the storage position in the staging region to the target position.

A process of generating the planning map by the first autonomous mobile machine, may be referred to related descriptions in subsequent embodiments. As shown in FIG. 3, after performing step 303, the RCS waits to receive the planning map from the first autonomous mobile machine in step 304.

As shown in FIG. 3, after receiving the planning map, the RCS performs step 305 to generate a handling task list by using the planning map.

The planning map generated by the first autonomous mobile machine is a two-dimensional map that contains a region from the target position to the cargo container transportation vehicle, such as map information from the bridging position to board a truck to the cargo container transportation vehicle and map information inside the cargo container transportation vehicle. For example, it may be a plane map in a grid form, each grid marks whether a region corresponding to this grid is traversable, and the planning map may be used to generate a handling task path. When generating the handling task, it is mainly to generate the handling task path, that is, path information from a departure position of a second autonomous mobile machine (referred to as a second departure position in the embodiments of the present disclosure) to the target storage position on the cargo container transportation vehicle.

In the embodiments of the present disclosure, the autonomous mobile machine that performs the mapping task and the autonomous mobile machine that performs the handling task may be a same autonomous mobile machine, or may be different autonomous mobile machines. If they are the same autonomous mobile machine, the above first departure position and the second departure position are usually the same. If they are different autonomous mobile machines, the above first departure position and the second departure position are usually different.

In this step, a position of the target storage position in the loading space of the cargo container transportation vehicle and the path from the target position to the target storage position may be determined according to the planning map and a cargo size, and in the embodiments of the present disclosure, the path from the target position to the target storage position is referred to as a dynamic handling path; and a handling task is generated according to the storage position in the staging region, material handling scenario information, and the dynamic handling path.

Since the planning map includes the map information of the loading space of the cargo container transportation vehicle, a position of the target storage position in the loading space of the cargo container transportation vehicle may be determined according to the cargo size, and these positions of target storage positions need to be ensured that cargo can be accommodated in sequence. In addition, according to the planning map, a path search algorithm such as Generalized Voronoi Diagram (GVD) and A-Star may be used to plan a path from the target position to the target storage position. Since a pose of the cargo container transportation vehicle varies, the path will differ accordingly, the path is essentially a dynamic path.

In the embodiments of the present disclosure, a cargo handling scenario mainly includes a loading scenario and an unloading scenario, and correspondingly, the handling task mainly includes a loading task and an unloading task. The loading task refers to handling the cargo from the storage position in the staging region to the target storage position in the loading space of the cargo container transportation vehicle, and the unloading task refers to handling the cargo from the target storage position in the loading space of the cargo container transportation vehicle to the storage position in the staging region.

As an implementable manner, a handling task list may be first generated. The handling task list includes at least one handling task. For the loading task, it is necessary to ensure that an order of loading cargo into storage positions in the loading space of the cargo container transportation vehicle for each handling task is from inside to outside. For the unloading task, it is necessary to ensure that an order of unloading cargo from the storage positions in the loading space of the cargo container transportation vehicle for each handling task is from outside to inside.

For each handling task, the handling task path may be generated by using the second departure position, the working map, and the dynamic handling path. The handling task path includes at least a path from the second departure position to the target storage position.

Specifically, if a type of the handling task is the loading task, the handling task path (that is, the path from the second departure position to the target storage position) includes: a path from the second departure position to the storage position in the staging region, a path from the storage position in the staging region to the target position, and a path from the target position to the target storage position, thereby completing a task of transporting cargo at the storage position in the staging region to the target storage position in the loading space of the cargo container transportation vehicle starting from the second departure position.

As an implementable manner, if the mapping task instruction sent in the step 303 includes information indicating loaded mapping and a type of the handling task is the loading task, a first handling task path may include: a path from the second departure position directly to the target storage position. The second departure position may be an end position of the mapping (that is, an end point of the dynamic mapping path), may be any position inside or near the cargo container transportation vehicle, or may be a specified docking position.

In an example in which the second departure position is the end position of the mapping, after the loaded mapping is completed, the first autonomous mobile machine waits at the end point of the dynamic mapping path, and after receiving the handling task instruction, the first autonomous mobile machine directly moves from the end point of the dynamic mapping path to the target storage position and places the cargo to the target storage position, thereby improving efficiency.

If the type of the handling task is an unloading task, in addition to the path from the second departure position to the target storage position, the handling task path may further include: a path from the target storage position to the storage position in the staging region, thereby completing a task of transporting cargo at the target storage position in the loading space of the cargo container transportation vehicle to the storage position in the staging region starting from the second departure position.

When planning the above mentioned path, the optimization based on the conflict detection may also be further performed, that is, the information of time window of a path segment conflicting with other autonomous mobile machines is optimized based on the conflict detection, and the specific method may be referred to the relevant descriptions in the previous embodiments, which is not repeated here.

In step 306, a handling task instruction is sent to the second autonomous mobile machine.

For a handling task, the RCS may include handling task path information in a handling task instruction and send the handling task instruction to the second autonomous mobile machine at one time, or may segment the handling task path information, and send the handling task path information to the second autonomous mobile machine through a plurality of sub-instructions of the handling task, which is not limited in the present disclosure.

During a process of executing the handling task by the second autonomous mobile machine, the RCS keeps communication with the second autonomous mobile machine, as shown in step 307 in FIG. 3, the RCS acquires state information of the second autonomous mobile machine, and if the RCS receives information of a task state sent by the second autonomous mobile machine after completing the handling task, the current handling task is ended and step 308 is performed; otherwise, the RCS returns to perform step 307.

In step 308, it is determined whether all the handling tasks in the handling task list are completed, if not, the process proceeds to step 306 to send an handling task instruction of a next handling task to the second autonomous mobile machine; and if yes, the process shown in FIG. 3 is ended.

Figure 5:
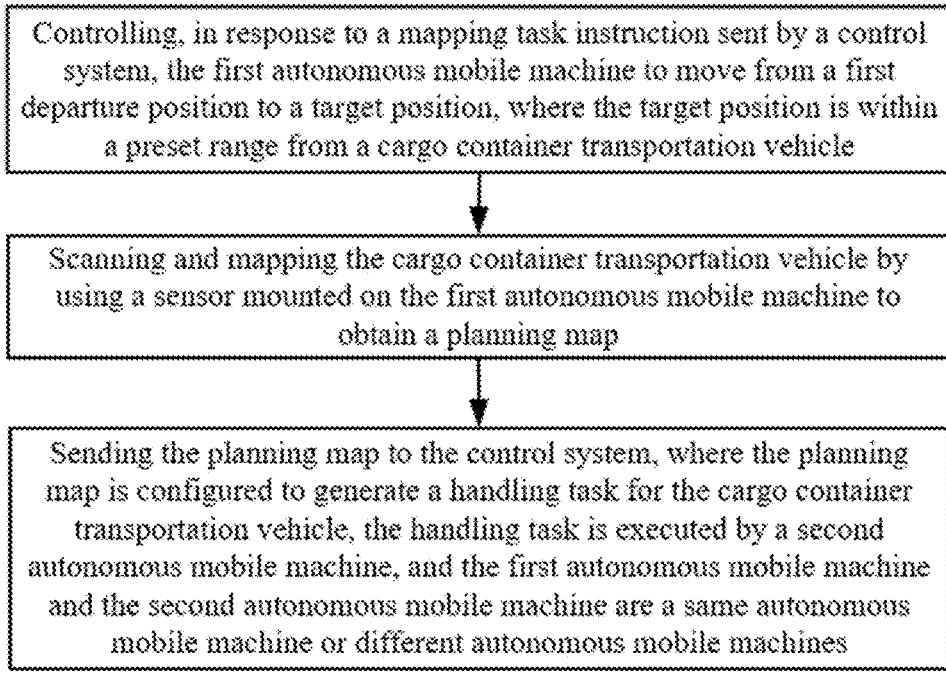
FIG. 5 is a flowchart of a method for executing a task according to an embodiment of the present disclosure.

FIG. 5 is a flowchart of a method for executing a task according to an embodiment of the present disclosure, the method may be performed by a first autonomous mobile machine. As shown in FIG. 5, the method may include the following steps.

Step 501: controlling, in response to a mapping task instruction sent by a control system, the first autonomous mobile machine to move from a first departure position to a target position, where the target position is within a preset range from a cargo container transportation vehicle.

Step 503: scanning and mapping the cargo container transportation vehicle by using a sensor mounted on the first autonomous mobile machine to obtain a planning map.

Step 505: sending the planning map to the control system, where the planning map is configured to generate a handling task for the cargo container transportation vehicle, the handling task is executed by a second autonomous mobile machine, and the first autonomous mobile machine and the second autonomous mobile machine are a same autonomous mobile machine or different autonomous mobile machines.

The steps in the foregoing process and effects that can be further generated are described in detail below with reference to a specific embodiment.

Figure 6:
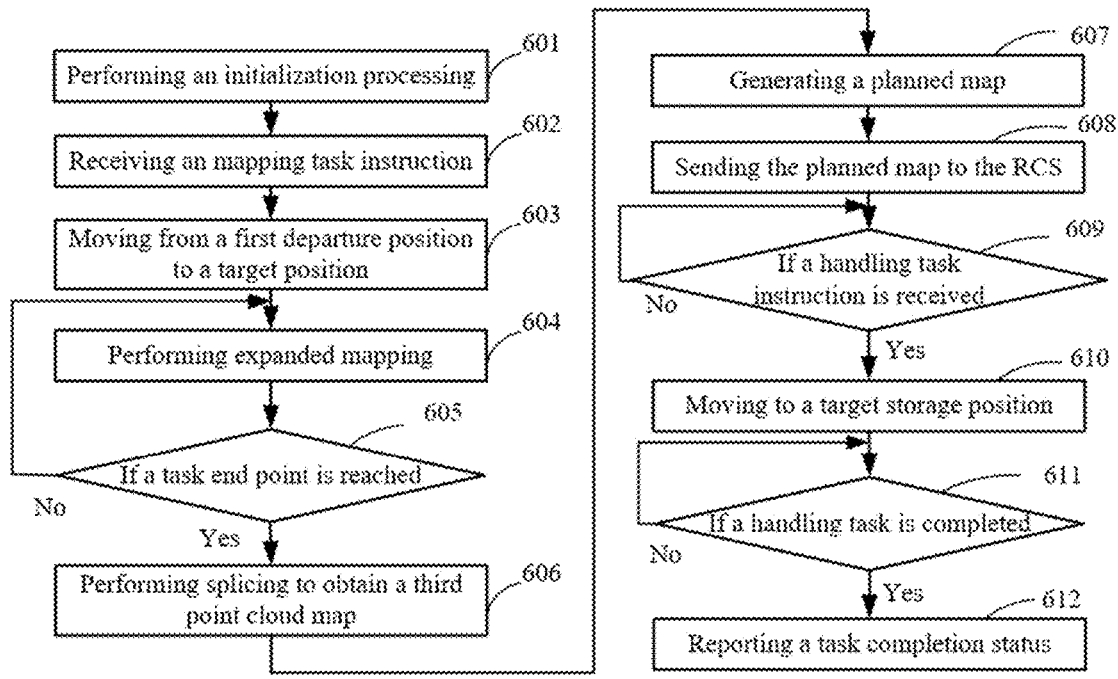
FIG. 6 is a flowchart of a detailed method performed by a first autonomous mobile machine and a second autonomous mobile machine according to an embodiment of the present disclosure.

In the embodiments of the present disclosure, after the first autonomous mobile machine is started, as shown in FIG. 6, initialization processing in step 601 may be performed first. The initialization process includes loading a static point cloud map, establishing a communication connection with a RCS, and the like.

The static point cloud map is a point cloud map of a working environment where the first autonomous mobile machine is located, and covers a working region of the autonomous mobile machine. In the embodiments of the present disclosure, the foregoing working region mainly refers to a region such as a warehouse, a dock, and a staging region, and may include a position of boarding the cargo container transportation vehicle, but usually does not include a region beyond a position of boarding the cargo container transportation vehicle (for example, a region of a loading space of the cargo container transportation vehicle, or the like).

If a mapping task instruction sent by the RCS is received in step 602, in step 603, the first autonomous mobile machine is controlled to move from a first departure position to a target position according to a static mapping path included in the mapping task instruction.

The mapping task instruction at least includes a static mapping path, that is, path information from a first departure position to a target position, and a planning method of the path information may be referred to related descriptions for the embodiments shown in FIG. 3, which is not repeated here.

As an implementable manner, in a case that the mapping task instruction includes information indicating loaded mapping, the first autonomous mobile machine is controlled to move from the first departure position to a storage position in a staging region, and the first autonomous mobile machine is controlled to move from the storage position in the staging region to the target position after handling cargo from the storage position in the staging region.

Further, the mapping task instruction may further include a dynamic mapping path, that is, path information for entering a loading space of the cargo container transportation vehicle from the target position. The path information may be preset with a low accuracy requirement, and it can be preset according to an approximate docking position and size of the cargo container transportation vehicle, as long as it is ensured that the autonomous mobile machine does not collide with the cargo container transportation vehicle.

Further, the mapping task instruction may further include return path information, the return path information may be a path returned from the target position to the first departure position, with a purpose of enabling the first autonomous mobile machine to return to the first departure position after completing scanning of the cargo container transportation vehicle.

In a process of controlling the first autonomous mobile machine to move from the first departure position to the target position according to the static mapping path included in the mapping task instruction, the first autonomous mobile machine scans environment data by using a sensor (for example, a radar) mounted on the first autonomous mobile machine, and obtains a first point cloud map from the first departure position to the target position by using a SLAM module.

Specifically, when the first autonomous mobile machine is controlled to move according to the path information included in the mapping task instruction, the SLAM module may use a Local SLAM algorithm to perform positioning. The Local SLAM algorithm may include: splicing a point cloud of a key frame collected in real time and a static point cloud map to obtain a first point cloud map, where the first point cloud map may be considered as a map obtained by aligning several latest collected key frames on the static point cloud map. A relative pose of a point cloud of a current frame relative to the first point cloud map is then calculated by using an algorithm, such as, a Generalized Iterative Closest Point (GICP) algorithm, to determine a current pose. Since the Local SLAM algorithm is an existing algorithm, details are not described herein.

The following describes in detail the foregoing step 503, that is "scanning and mapping the cargo container transportation vehicle by using a sensor mounted on the first autonomous mobile machine to obtain a planning map" in combination with embodiments.

After the first autonomous mobile machine moves to the target position, for example, after the first autonomous mobile machine reaches a bridging position to board a truck, step 604 is performed to start expanded mapping to obtain a second point cloud map. In step 605, it is determined whether to move to a task end point, if yes, step 606 is performed, otherwise, the process returns to continue performing step 604.

The sensor mounted on the autonomous mobile machine may include a radar such as a laser radar, a millimeter-wave radar, and a time-of-flight (ToF) radar, and may further include a visual sensor such as a camera.

A process of the above expanded mapping may include: along a dynamic mapping path included in the mapping task instruction, moving from the target position and entering the loading space of the cargo container transportation vehicle, and performing scanning by using a mounted sensor in a moving process, where in a whole process, an exterior and interior regions of the cargo container transportation vehicle may be obtained through the scanning, and a dynamic point cloud map of a region of the cargo container transportation vehicle is established by the SLAM module, which is referred to as the second point cloud map.

Figure 7:
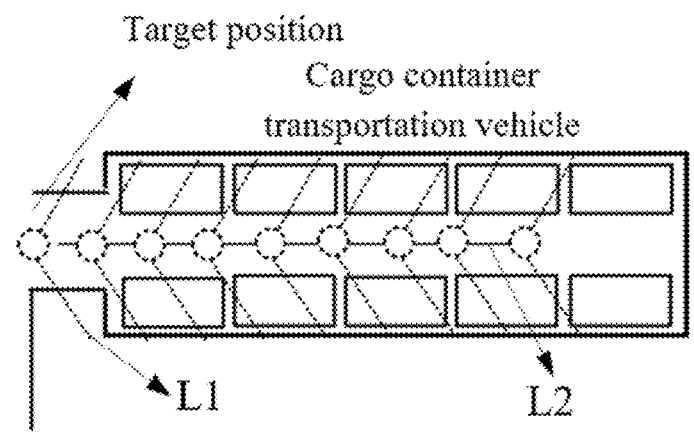
FIG. 7 is a schematic diagram of scanning a cargo container transportation vehicle according to an embodiment of the present disclosure.

As shown in FIG. 7, dotted circles in the figure are some positions of the first autonomous mobile machine in the moving process, the first autonomous mobile machine enters the loading space of the cargo container transportation vehicle from the target position along a path indicated by a straight line L2 in the figure, and a dotted line L1 indicates a radar scanning region of the first autonomous mobile machine. In the moving process, the first autonomous mobile machine initially scans the external environment of the cargo container transportation vehicle, then scans an internal environment of the cargo container transportation vehicle after entering the cargo container transportation vehicle, and obtains point cloud data configured to obtain the second point cloud map.

The first autonomous mobile machine may not move to an end of the loading space of the cargo container transportation vehicle, as long as it is ensured that each part of the loading space can be scanned.

For a container truck, a container ship, or the like, an entry position to the loading space is typically a rear door. Therefore, the container truck and the container ship usually align their rear doors with a bridging position to board a truck and a bridging position to board a ship respectively. As a result, it is easier to perform approximate planning of a dynamic mapping path for entering the loading space of the cargo container transportation vehicle from the target position, and the dynamic mapping path information is included in the mapping task instruction. However, there are still some special cases, for example, side plates of two wings of a flying wing vehicle (also referred to as a wing vehicle, a two-wing vehicle, or the like) can be opened, and a rear door of a trailer can also be opened, so that an entry position to board a vehicle is not determined, and therefore, path information for entering the trailer of the flying wing vehicle from the target position cannot be planned approximately in advance. For these special cases, after reaching the target position, the first autonomous mobile machine may circle around the vehicle and collect images of the flying wing vehicle through a visual camera, and determine, an entry position to board a vehicle, of the flying wing vehicle by an image recognition method. Then, the first autonomous mobile machine may enter the trailer from the entry position to board a vehicle, so as to complete collection of point cloud data and establish the second point cloud map.

The SLAM module may store scanned key frame data (including the point cloud data and corresponding pose information) in a memory of the autonomous mobile machine in the moving process of the autonomous mobile machine. After reaching an end point of a path, the key frame data stored in the memory can be spliced together according to the pose information. After down-sampling is performed on the spliced point cloud data, the second point cloud map is formed.

After the end point of the path is reached, step 606 is performed to splice the first point cloud map and the second point cloud map to obtain and store a third point cloud map. It can be seen that the third point cloud map is used as a full point cloud map, and the third point cloud map may be used by an autonomous mobile machine (referred to as a second autonomous mobile machine in the embodiments of the present disclosure) executing a subsequent handling task to determine a pose in a process of executing a handling task.

After the first autonomous mobile machine arrives at the end point of the path (that is, the path for entering the loading space of the cargo container transportation vehicle from the target position), if there is sufficient space, the first autonomous mobile machine may turn around and return along the return path information included in the mapping task instruction. If there is not enough space, the first autonomous mobile machine may first reverse along the return path information included in the mapping task instruction to retreat back to the target position, and then turn around to continue returning to the first departure position along the return path information.

As another implementable manner, if the first autonomous mobile machine adopts a method of loaded mapping, that is, the mapping task instruction received includes information indicating loaded mapping, the first autonomous mobile machine moves from the first departure position to a storage position in a staging region, and after handling the cargo from the storage position in the staging region, the first autonomous mobile machine moves from the storage position in the staging region to the target position, and then starts scanning and mapping along the dynamic mapping path. In this manner, after the loaded mapping is completed, the first autonomous mobile machine may wait at an end point of the dynamic mapping path, or may wait at any position in or near the cargo container transportation vehicle, or may wait at a specified docking position, so that a waiting position of the first autonomous mobile machine is a second departure position for subsequently executing the handling task.

In step 607, a planning map is generated by using the second point cloud map.

In this step, the first autonomous mobile machine may extract point cloud data within a target range from the second point cloud map, and project extracted point cloud data to the ground plane to obtain the planning map.

The target range refers to an operating height range of the cargo container transportation vehicle, and it can be set based on an empirical value, for example, a height range of 0.2 meters to 2.5 meters may be selected according to a general height of the cargo container transportation vehicle. It may also be set according to an actual scenario.

The planning map is a two-dimensional map, after the extracted point cloud data is projected to the ground plane, binarization processing is further performed to obtain an initial map, and then rasterization processing is performed on the initial map to obtain a grid map as the planning map. The rasterization processing may include dividing the initial map into a plurality of grids, and determining a state of each grid according to a projection relationship between the point cloud data and the grids. the state includes an occupied state or an idle state.

If the grid is occupied, it is determined that there is an obstacle in the grid and the grid is not traversable; if the grid is not occupied, it is determined that there is no obstacle in the grid and the grid is traversable. The state of the grid may be determined according to the number of point cloud points projected to the grid. For example, if the number of point cloud points projected to the grid exceeds a preset number threshold, it is determined that the grid is in an occupied state, otherwise, it is determined that the grid is in an idle state. The preset number threshold may be determined based on an empirical value, a security requirement degree, or the like.

In addition to the grid map, the planning map may also adopt other forms of maps, such as a point density map.

The planning map may be in an image format, for example, Portable Network Graphics (PNG), Bitmap (BMP), or other lossless compression image formats.

In step 608, the first autonomous mobile machine sends the planning map to the RCS.

At this time, the mapping task of the first autonomous mobile machine is completed. After receiving the planning map, the RCS generates the handling task and issues the handling task to the second autonomous mobile machine. In the embodiments of the present disclosure, the first autonomous mobile machine and the second autonomous mobile machine may be different autonomous mobile machines, and in order to ensure that the second autonomous mobile machine can complete pose determination when executing the handling task, the third point cloud map may be provided to the second autonomous mobile machine by the first autonomous mobile machine.

As an implementable manner, the first autonomous mobile machine may directly transmit the third point cloud map to the second autonomous mobile machine, for example, in a near field communication manner.

As another implementable manner, the first autonomous mobile machine transmits the third point cloud map to the RCS, and the second autonomous mobile machine downloads the third point cloud map from the RCS.

As still another implementable manner, the third point cloud map of the first autonomous mobile machine may be copied to a storage system in a local area network, for example, a Network Attached Storage (NAS), and then the third point cloud map in the storage system is copied to the second autonomous mobile machine.

Other methods may also be used to provide the third point cloud map of the first autonomous mobile machine to the second autonomous mobile machine, and these are not listed one by one here.

The first autonomous mobile machine and the second autonomous mobile machine may be a same autonomous mobile machine. The following is an example in which they are the same autonomous mobile machine, the first autonomous mobile machine continues to perform step 609 shown in FIG. 6, waiting for the handling task instruction issued by the RCS. If the handling task instruction is received, the first autonomous mobile machine performs step 610, otherwise, the first autonomous mobile machine continues to wait.

In step 610, according to the handling task path included in the handling task instruction, that is, path information from the second departure position (which may be the first departure position when the first autonomous mobile machine and the second autonomous mobile machine are the same autonomous mobile machine) to the target storage position of the cargo container transportation vehicle, the first autonomous mobile machine is controlled to move to the target storage position.

In the above moving process of the first autonomous mobile machine, the SLAM module determines and adjusts a pose by using the third point cloud map, so as to ensure that the first autonomous mobile machine moves to the target storage position.

The handling task instruction may include a task type and the path information mentioned above. If the task type is a loading task, the first autonomous mobile machine reaches the storage position in the staging region from the second departure position according to the path information, handles the cargo from the storage position in the staging region and reaches the target position (for example, a bridging position to board a truck) from the storage position in the staging region, and then reaches the target storage position in the loading space of the cargo container transportation vehicle from the target position to place the cargo in the target storage position.

As another implementable manner, if the first autonomous mobile machine previously uses the method of the loaded mapping, when performing a first loading task, the first autonomous mobile machine may directly reach the target storage position from the second departure position, and place the carried cargo in the target storage position. For the subsequent loading task, the first autonomous mobile machine needs to pick up cargo from the storage position in the staging region, transport the cargo to the target storage position and place the cargo at the target storage position.

If the task type is an unloading task, the first autonomous mobile machine reaches the target storage position in the loading space of the cargo container transportation vehicle from the second departure position according to the path information, handles the cargo from the target storage position and transport the cargo to the storage position in the staging region, and places the cargo in the storage position in the staging region.

The first autonomous mobile machine may report status information to the RCS in the process of executing the handling task. In step 611, it is determined whether the handling task is completed, and if the handling task is completed, step 612 is performed to report information of a task completion status to the RCS; otherwise, step 611 continues to be performed.

It should be noted that if the path information in the handling task instruction is sent in a segmented manner, the first autonomous mobile machine may receive a plurality of sub-instructions corresponding to one handling task. Each sub-instruction includes one piece of path information, and the first autonomous mobile machine moves to the target storage position according to the received sub-instructions to complete the handling task.

After the first autonomous mobile machine reports information about the task completion status, the first autonomous mobile machine may wait to receive a new handling task or a new mapping task.

Further, since there may be a plurality of handling tasks in a handling task list formed at the RCS side, the second autonomous mobile machine receives and executes handling task instructions one by one, and cannot learn whether the handling tasks in the entire handling task list are completed. Therefore, the second point cloud map may be cleared in response to receiving the new mapping task instruction. That is, receiving a new mapping task means that the handling tasks in the handling task list are all completed. Since a docking position and posture of the cargo container transportation vehicle are different each time the cargo container transportation vehicle arrives, it is need to perform the mapping task and the handling task each time, therefore, the second point cloud map used in a previous handling task is no longer applicable and can be cleared.

In this way, it is ensured that the second point cloud map is reserved before all the handling tasks are completed to ensure the normal completion of the handling tasks, and on the other hand, it is ensured that the second point cloud map is cleared in time after all the handling tasks are completed, so that a storage space of the first autonomous mobile machine is saved, and the performance of the first autonomous mobile machine is improved.

The specific embodiments of the present specification are described above. Other embodiments are within a scope of the claims. In some cases, actions or steps recited in the claims may be performed in an order different from that in the embodiments and still achieve a desired result. In addition, the processes depicted in the figures do not necessarily require the particular order or the sequential order to achieve the desired results. In some embodiments, multitasking and parallel processing are also possible or may be advantageous.

A task processing system provided in the embodiments of the present disclosure includes a control system, a first autonomous mobile machine, and a second autonomous mobile machine.

The control system is configured to send a mapping task instruction to the first autonomous mobile machine.

The first autonomous mobile machine is configured to: control, in response to the mapping task instruction, the first autonomous mobile machine to move from a first departure position to a target position, where the target position is within a preset range from a cargo container transportation vehicle; scan and map the cargo container transportation vehicle by using a sensor mounted on the first autonomous mobile machine to obtain a planning map; and send the planning map to the control system.

The control system is further configured to generate a handling task based on the planning map, and send a handling task instruction to the second autonomous mobile machine, where the handling task instruction includes a handling task path, and the handling task path is path information from a second departure position to a target storage position on the cargo container transportation vehicle.

The second autonomous mobile machine is configured to execute the handling task according to the handling task instruction.

The first autonomous mobile machine and the second autonomous mobile machine are a same autonomous mobile machine or different autonomous mobile machines, and the first departure position and the second departure position are a same position or different positions.

For functions and specific processing of the control system, the first autonomous mobile machine, and the second autonomous mobile machine in the system, may be referred to related descriptions in the previous embodiments of the methods, which are not repeated herein.

Figure 8:
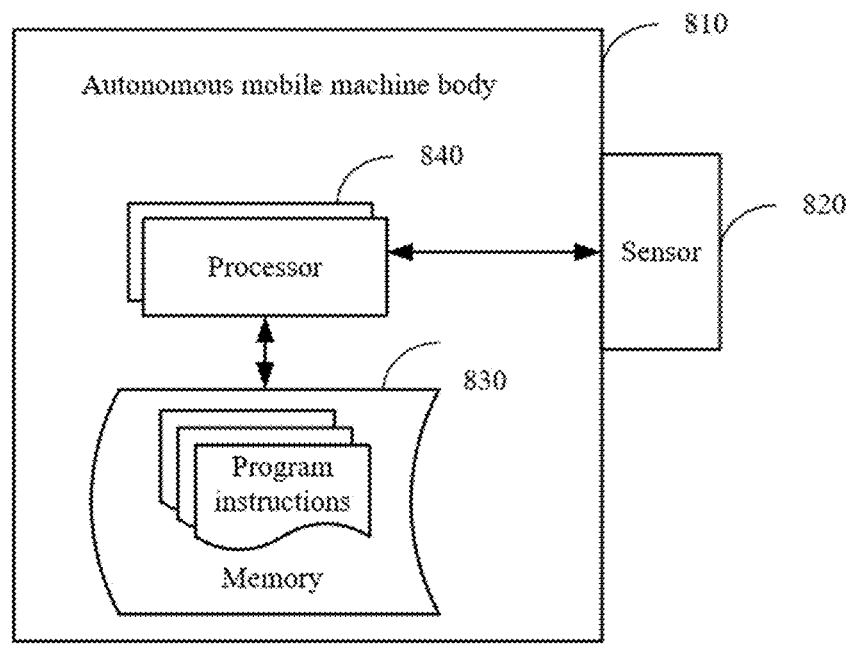
FIG. 8 is a schematic block diagram of an autonomous mobile machine according to an embodiment of the present disclosure.

FIG. 8 is a schematic composition diagram of an autonomous mobile machine according to an embodiment of the present disclosure, as shown in FIG. 8, the autonomous mobile machine includes an autonomous mobile machine body 810, a sensor 820 mounted on the autonomous mobile machine body, a memory 830, and a processor 840.

The sensor 820 is configured to scan a cargo container transportation vehicle.

The memory 830 is configured to store program instructions.

The processor 840 is coupled to the memory 830, and is configured to read the program instructions stored in the memory 830 to perform the following process:

controlling, in response to a mapping task instruction sent by a control system, the autonomous mobile machine to move from a departure position to a target position, where the target position is within a preset range from the cargo container transportation vehicle;

scanning and mapping the cargo container transportation vehicle by using the sensor to obtain a planned map; and sending the planning map to the control system, where the planning map is configured to generate a handling task for the cargo container transportation vehicle.

In some embodiments, the mapping task instruction may include a static mapping path, and the static mapping path is path information from the departure position to the target position.

In some embodiments, in a case that the mapping task instruction includes information indicating loaded mapping, the processor 840 may specifically perform the following process when controlling the autonomous mobile machine to move from the departure position to the target position:

controlling the autonomous mobile machine to move from the departure position to a storage position in a staging region, and controlling the autonomous mobile machine to move from the storage position in the staging region to the target position after handling cargo from the storage position in the staging region.

In some embodiments, the processor 840 may specifically perform the following process when scanning and mapping the cargo container transportation vehicle by the sensor mounted on the autonomous mobile machine:

controlling the autonomous mobile machine to move from the target position and enter a loading space of the cargo container transportation vehicle;

scanning environment data by using the sensor in a moving process, and obtaining a second point cloud map for entering the loading space from the target position by using a SLAM module; and projecting the second point cloud map to a ground plane to obtain the planning map.

In some embodiments, the mapping task instruction further includes: a dynamic mapping path, where the dynamic mapping path is path information for entering the loading space of the cargo container transportation vehicle from the target position; and the processor 840 executes, according to the dynamic mapping path, a process of controlling the autonomous mobile machine to move from the target position and enter the loading space of the cargo container transportation vehicle.

In some embodiments, the processor 840 may specifically perform the following process when controlling the autonomous mobile machine to move from the target position and enter the loading space of the cargo container transportation vehicle:

controlling the autonomous mobile machine to start from the target position, move around the cargo container transportation vehicle and determine a position of entering the loading space, and enter the loading space from a determined position.

In some embodiments, the processor 840 may specifically perform the following process when projecting the second point cloud map to the ground plane to obtain the planning map:

extracting, from the second point cloud map, point cloud data within an operating height range of the cargo container transportation vehicle; and projecting extracted point cloud data to the ground plane and performing binarization processing to obtain the planning map.

In some embodiments, in a process of controlling the autonomous mobile machine to move from the departure position to the target position, the processor 840 further performs the following process:

obtaining environmental data scanned by the sensor, obtaining a key frame from the departure position to the target position by using a SLAM module, and splicing the key frame with a static point cloud map loaded during initialization of the autonomous mobile machine to obtain a first point cloud map.

In some embodiments, the processor 840 further performs: splicing the first point cloud map and the second point cloud map to obtain and store a third point cloud map.

In some embodiments, the processor 840 further performs: clearing, in response to receiving a new mapping task instruction, the second point cloud map.

In some embodiments, the sensor 820 may include a radar such as a laser radar, a millimeter-wave radar, and a time-of-flight (ToF) radar, and may further include a visual sensor such as a camera.

In some embodiments, the processor 840 may be one or more, which may be implemented in a form of a general Central Processing Unit (CPU), a microprocessor, an application specific integrated circuit (ASIC), one or more integrated circuits, or the like, for executing the foregoing program instructions to implement the technical solutions provided in the present disclosure.

The memory 830 may be implemented in a form of a Read Only Memory (ROM), a Random Access Memory (RAM), a static storage device, a dynamic storage device, or the like.

It should be noted that, although the foregoing autonomous mobile machine only shows the autonomous mobile machine body 810, the sensor 820, the memory 830, the processor 840, and the like, in a specific implementation process, the autonomous mobile machine may further include other components that are necessary for normal operation. In addition, a person skilled in the art may understand that the foregoing autonomous mobile machine may also include only the components that are necessary for implementing solutions of the present disclosure, and does not necessarily include all the components shown in the figures.

Figure 9:
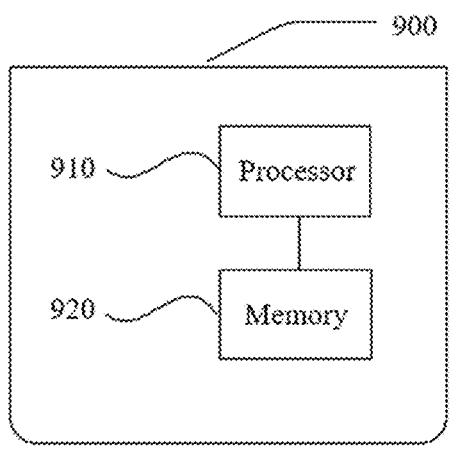
FIG. 9 is a schematic block diagram of an electronic device configured to perform a method for scheduling a task or a method for executing a task according to an embodiment of the present disclosure.

Referring to FIG. 9, an electronic device 900 includes: a processor 910, and a memory resource represented by a memory 920 for storing instructions executable by the processor 910, such as an application program. The application program stored in the memory 920 may include one or more modules each corresponding to a set of instructions. In addition, the processor 910 is configured to execute instructions to perform the foregoing method for scheduling a task or the method for executing a task. For example, the electronic device 900 includes a controller, and the controller includes: a processor; and a memory configured to store an instruction executable by the processor, where the processor is configured to implement the foregoing method for executing the task. Specifically, the controller may be a controller of an autonomous mobile machine.

The electronic device 900 may further include: a power supply component, configured to perform power management of the electronic device 900; a wired or wireless network interface, configured to connect the electronic device 900 to a network; and an input/output (I/O) interface. The electronic device 900 may be operated based on an operating system stored in the memory 920, such as Windows Server™, Mac OS X™, Unix™, Linux™, and FreeBSD™

A non-transitory computer-readable storage medium is provided, and when instructions in the storage medium are executed by the processor of the electronic device 900, the electronic device 900 can perform the foregoing method for scheduling a task or the method for executing a task.

According to specific embodiments provided in the present disclosure, the present disclosure discloses the following technical effects.

Firstly, in the present disclosure, the control system adopts a two-stage task. Firstly, the first autonomous mobile machine is scheduled to execute a mapping task, and in a process of executing the mapping task by the first autonomous mobile machine, the cargo container transportation vehicle is scanned and mapped by using the sensor mounted on the first autonomous mobile machine to obtain the planning map; and then the second autonomous mobile machine is scheduled based on the planning map to execute the handling task. According to this two-stage task scheduling mode, even if a docking position and a docking posture of the cargo container transportation vehicle are different each time, a pose of the cargo container transportation vehicle may be obtained in real time and the planning map is obtained through a mapping task stage, thereby ensuring that the second autonomous mobile machine, which executes the handling task in the second stage, may accurately perform loading and unloading operations.

Secondly, since the sensor mounted on the first autonomous mobile machine is used to scan and map the cargo container transportation vehicle, compared with a traditional method of using an external sensor mounted on a bridging position, a construction difficulty and maintenance cost are reduced and a relationship between a coordinate system of the external sensor and a coordinate system of the autonomous mobile machine is also prevented from being calibrated, so that an implementation is more convenient, and a cost is lower.

Thirdly, according to the present disclosure, a path from the first departure position to the target position is planned according to the position information of the cargo container transportation vehicle and a static working map, and path information is included in the mapping task instruction, so that when the first autonomous mobile machine executes the mapping task, the first autonomous mobile machine can accurately reach the target position according to the path information, and the first autonomous mobile machine can start to scan and map the cargo container transportation vehicle from the target position by using the sensor mounted on the first autonomous mobile machine. This way may reduce a precision requirement for a docking pose of the cargo container transportation vehicle and offer higher compatibility with the diversity of container transportation vehicles.

Fourthly, in the present disclosure, in a process of moving from the target position and entering the loading space of the cargo container transportation vehicle, the first autonomous mobile machine scans the environment data by using the sensor and obtains the second point cloud map for entering the loading space from the target position by using the SLAM module, and then projects the second point cloud map to the ground plane to obtain the planning map. The planning map generated in this manner may accurately describe the pose of the cargo container transportation vehicle, so that the control system can generate the handling path based on the planning map and include the handling path in the handling task instruction to guide the second autonomous mobile machine to accurately execute the handling task.

Fifthly, in the present disclosure, the point cloud data within the operating height range of the cargo container transportation vehicle may be extracted from the second point cloud map, and the extracted point cloud data is projected to the ground plane and subjected to the binarization processing to obtain the planning map. In this way, on one hand, a volume of the point cloud data of a map processing is reduced, and on the other hand, an actual condition of the loading space of the cargo container transportation vehicle may be more accurately reflected in the planning map.

Sixthly, in the present disclosure, the control system may accurately determine the position of the target storage position in the loading space of the cargo container transportation vehicle and the path from the target position to the target storage position by using the planning map, generated and sent by the first autonomous mobile machine, and the cargo size, so that the second autonomous mobile machine may accurately execute the handling task, thereby improving the handling efficiency and security.

Seventhly, in the present disclosure, the first autonomous mobile machine can splice the key frame obtained from the first departure position to the target position with the static point cloud map loaded during the initialization to obtain the first point cloud map, and may further splice the first point cloud map and the second point cloud map for entering the loading space from the target position to obtain a full third point cloud map. The full third point cloud map may be used to determine a pose in the process of executing the handling task by the second autonomous mobile machine, thereby ensuring that the second autonomous mobile machine executes the handling task accurately and efficiently.

Lastly, in the present disclosure, after receiving a new mapping task instruction, the first autonomous mobile machine clears the second point cloud map, on one hand, it ensures that the second point cloud map is reserved before all the handling tasks are completed to ensure normal completion of the handling tasks, and on the other hand, it ensures that the second point cloud map is cleared in time after all the handling tasks are completed, so that a storage space of the first autonomous mobile machine is saved, and the performance of the first autonomous mobile machine is improved.

Of course, any invention of the present disclosure does not necessarily need to achieve all of the advantages described above at the same time.

Each embodiment in the specification is described in a progressive manner, the same or similar parts between the embodiments may refer to each other, and each embodiment focuses on differences from other embodiments. In particular, for a system or device embodiment, since it is substantially similar to the method embodiment, it is described more simply, and for the relevant parts, reference may be made to the description of the method embodiment. The system and device embodiments described above are merely illustrative, the units described as separate components may or may not be physically separate, and components displayed as units may or may not be physical units, that is, may be located in one position, or may be distributed on a plurality of network units. Some or all of the modules may be selected according to actual needs to achieve the objective of the solutions of the embodiments. A person of ordinary skill in the art may understand and implement the embodiments of the present disclosure without creative efforts.

A computer program product is further provided in an embodiment of the present disclosure, and when the computer program product runs on a computer, the computer is enabled to perform the steps of the method in the foregoing method embodiments.

The technical solutions provided in the present disclosure are described in detail above, and specific examples are used herein to describe the principle and implementation of the present disclosure. The description of the above embodiments is only used to help understand the method and the core idea of the present disclosure; meanwhile, for a person of ordinary skill in the art, according to the idea of the present disclosure, there may be a change in the specific implementation and the application range. In conclusion, the content of the present specification should not be construed as a limitation on the present disclosure.

What is claimed is:

1. A method for scheduling a task, performed by a control system, wherein the method comprises:
    sending a mapping task instruction to a first autonomous mobile machine;
    receiving a planning map sent by the first autonomous mobile machine, wherein the planning map is obtained after the first autonomous mobile machine scans and maps a cargo container transportation vehicle by using a sensor mounted on the first autonomous mobile machine, wherein the planning map comprises map information of a loading space of the cargo container transportation vehicle; and
    generating a handling task based on the planning map, and sending a handling task instruction to a second autonomous mobile machine, so as to control the second autonomous mobile machine to execute the handling task, wherein the handling task instruction comprises a handling task path, and the handling task path is path information from a second departure position to a target storage position on the cargo container transportation vehicle,
    wherein the first autonomous mobile machine and the second autonomous mobile machine are a same autonomous mobile machine or different autonomous mobile machines.

2. The method according to claim 1, wherein the mapping task instruction comprises a static mapping path, the static mapping path is path information from a first departure position to a target position, and the target position is within a preset range from the cargo container transportation vehicle; and
    the first departure position and the second departure position are a same position or different positions.

3. The method according to claim 2, wherein before the sending the mapping task instruction to the first autonomous mobile machine, the method further comprises:
    planning the static mapping path according to a working map and position information of the cargo container transportation vehicle.

4. The method according to claim 2, wherein the mapping task instruction further comprises: information indicating unloaded mapping or information indicating loaded mapping.

5. The method according to claim 4, wherein in a case that the mapping task instruction comprises the information indicating loaded mapping, the static mapping path comprises a path from the first departure position to a storage position in a staging region and a path from the storage position in the staging region to the target position.

6. The method according to claim 2, wherein the mapping task instruction further comprises a dynamic mapping path and/or return path information, and the dynamic mapping path is path information for entering the loading space of the cargo container transportation vehicle from the target position.

7. The method according to claim 1, wherein the generating the handling task based on the planning map comprises:
    determining a position of the target storage position on the cargo container transportation vehicle and a dynamic handling path according to the planning map and a cargo size, wherein the dynamic handling path is a path from a target position to the target storage position, and the target position is within a preset range from the cargo container transportation vehicle; and generating the handling task according to a storage position in a staging region, material handling scenario information and the dynamic handling path.

8. The method according to claim 7, wherein before the sending the handling task instruction to the second autonomous mobile machine, the method further comprises:

generating the handling task path according to the second departure position, a working map and the dynamic handling path.

9. The method according to claim 7, wherein a type of the handling task is a loading task, and the handling task path comprises: a path from the second departure position to the storage position in the staging region, a path from the storage position in the staging region to the target position, and a path from the target position to the target storage position; or, a type of the handling task is an unloading task, and the handling task path further comprises a path from the target storage position to the storage position in the staging region.

10. An autonomous mobile machine, wherein the autonomous mobile machine is a first autonomous mobile machine, and the first autonomous mobile machine comprises:

an autonomous mobile machine body;

a sensor, mounted on the autonomous mobile machine body, and configured to scan a cargo container transportation vehicle;

a memory, configured to store program instructions; and a processor, coupled to the memory, and configured to read the program instructions to perform following steps:

controlling, in response to a mapping task instruction sent by a control system, the first autonomous mobile machine to move from a first departure position to a target position, wherein the target position is within a preset range from a cargo container transportation vehicle;

scanning and mapping the cargo container transportation vehicle by using a sensor mounted on the first autonomous mobile machine to obtain a planning map, wherein the planning map comprises map information of a loading space of the cargo container transportation vehicle; and sending the planning map to the control system, wherein the planning map is configured to generate a handling task for the cargo container transportation vehicle, and the handling task is executed by a second autonomous mobile machine, wherein the first autonomous mobile machine and the second autonomous mobile machine are a same autonomous mobile machine or different autonomous mobile machines.

11. The autonomous mobile machine according to claim 10, wherein the mapping task instruction comprises a static mapping path, and the static mapping path is path information from the first departure position to the target position.

12. The autonomous mobile machine according to claim 10, wherein in a case that the mapping task instruction comprises information indicating loaded mapping, controlling the first autonomous mobile machine to move from the first departure position to the target position comprises:

controlling the first autonomous mobile machine to move from the first departure position to a storage position in a staging region, and controlling the first autonomous mobile machine to move from the storage position in the staging region to the target position after handling cargo from the storage position in the staging region.

13. The autonomous mobile machine according to claim 10, wherein the scanning and mapping the cargo container transportation vehicle by using the sensor mounted on the first autonomous mobile machine to obtain the planning map comprises:

controlling the first autonomous mobile machine to move from the target position and enter the loading space of the cargo container transportation vehicle;

scanning environment data by using the sensor in a moving process, and obtaining a second point cloud map for entering the loading space from the target position by using a Simultaneous Localization and Mapping (SLAM) module; and projecting the second point cloud map to a ground plane to obtain the planning map.

14. The autonomous mobile machine according to claim 13, wherein the mapping task instruction further comprises a dynamic mapping path, and the dynamic mapping path is path information for entering the loading space of the cargo container transportation vehicle from the target position.

15. The autonomous mobile machine according to claim 13, wherein the controlling the first autonomous mobile machine to move from the target position and enter the loading space of the cargo container transportation vehicle comprises:

controlling the first autonomous mobile machine to start from the target position, move around the cargo container transportation vehicle and determine a position of entering the loading space, and enter the loading space from a determined position.

16. The autonomous mobile machine according to claim 13, wherein the projecting the second point cloud map to the ground plane to obtain the planning map comprises:

extracting, from the second point cloud map, point cloud data within an operating height range of the cargo container transportation vehicle; and projecting extracted point cloud data to the ground plane and performing binarization processing to obtain the planning map.

17. The autonomous mobile machine according to claim 13, wherein in a process of controlling the first autonomous mobile machine to move from the first departure position to the target position, the processor is further configured to perform following steps:

scanning environment data by using the sensor, obtaining a key frame from the first departure position to the target position by using the SLAM module, and splicing the key frame with a static point cloud map loaded during initialization of the first autonomous mobile machine to obtain a first point cloud map.

18. The autonomous mobile machine according to claim 17, wherein the processor is further configured to perform a following step:

splicing the first point cloud map and the second point cloud map to obtain a third point cloud map.

19. The autonomous mobile machine according to claim 18, wherein in a case that the second autonomous mobile machine and the first autonomous mobile machine are a same autonomous mobile machine, the second autonomous mobile machine is configured to determine a pose according to the third point cloud map in a process of executing the handling task; or, in a case that the second autonomous mobile machine and the first autonomous mobile machine are different autonomous mobile machines, the processor is further configured to perform a following step: transmitting, by the first autonomous mobile machine, the third point cloud map to the second autonomous mobile machine, to enable the second autonomous mobile machine to determine a pose according to the third point cloud map in a process of executing the handling task.

20. The autonomous mobile machine according to claim 10, wherein in a case that the second autonomous mobile machine and the first autonomous mobile machine are a same autonomous mobile machine, after scanning and mapping the cargo container transportation vehicle, the processor is further configured to perform a following step: controlling the first autonomous mobile machine to move to a second departure position and wait for a handling task instruction sent by the control system, wherein the first departure position and the second departure position are a same position or different positions.

21. A controller, comprising:
a processor; and
a memory configured to store an instruction executable by the processor, wherein the processor is configured to implement a method for executing a task, and the method comprises:

controlling, in response to a mapping task instruction sent by a control system, a first autonomous mobile machine to move from a first departure position to a target position, wherein the target position is within a preset range from a cargo container transportation vehicle;

scanning and mapping the cargo container transportation vehicle by using a sensor mounted on the first autonomous mobile machine to obtain a planning map, wherein the planning map comprises map information of a loading space of the cargo container transportation vehicle; and sending the planning map to the control system, wherein the planning map is configured to generate a handling task for the cargo container transportation vehicle, and the handling task is executed by a second autonomous mobile machine, wherein the first autonomous mobile machine and the second autonomous mobile machine are a same autonomous mobile machine or different autonomous mobile machines.

* * * * *